(12) United States Patent
Albright et al.

(10) Patent No.: US 6,652,188 B1
(45) Date of Patent: Nov. 25, 2003

(54) FLUID COUPLED CONTROL SYSTEM FOR IRRIGATION

(76) Inventors: David T. Albright, 6473 Hwy. 96 West, Youngsville, NC (US) 27596; Dale S. Albright, 157 Wiggins Rd., Louisburg, NC (US) 27549

( * ) Notice: Subject to any disclaimer, the term of this patent is extended or adjusted under 35 U.S.C. 154(b) by 0 days.

(21) Appl. No.: 10/135,204

(22) Filed: Apr. 30, 2002

(51) Int. Cl.[7] .............................................. E02B 11/00
(52) U.S. Cl. ......................................... 405/37; 137/78.3
(58) Field of Search ........................... 137/78.3; 405/37, 405/36, 39, 40, 41, 51

(56) References Cited

U.S. PATENT DOCUMENTS

| | | | | | |
|---|---|---|---|---|---|
| 3,114,243 A | * | 12/1963 | Winters | ...................... | 405/37 |
| 4,548,225 A | * | 10/1985 | Busalacchi | ................. | 137/78.3 |
| 4,684,920 A | * | 8/1987 | Reiter | ........................ | 137/78.3 |
| 5,048,755 A | * | 9/1991 | Dodds | ........................ | 137/78.2 |
| 5,954,450 A | * | 9/1999 | Rolfe | ........................... | 405/37 |
| 6,267,298 B1 | * | 7/2001 | Campbell | .................... | 239/70 |

* cited by examiner

Primary Examiner—Heather Shackelford
Assistant Examiner—Frederick Lagman
(74) Attorney, Agent, or Firm—Mills Law Firm PLLC

(57) ABSTRACT

An irrigation control system includes a transmitter/receiver coupled to the outlet of an irrigation conduit in a remote irrigation zone that receives a signal from a moisture sensor in the irrigation zone and transmits an acoustic signal through the conduit to a transmitter/receiver at the control valve for the conduit. The received signal is analyzed and conditions the control valve for opening if watering criteria is met.

7 Claims, 5 Drawing Sheets

FLUID COUPLED CONTROL SYSTEM FOR IRRIGATION

FIELD OF THE INVENTION

The present invention relates to irrigation control systems and, in particular, to a moisture control system for irrigation using existing in-place supply lines and conduits to communicate information for controlling irrigation requirements.

BACKGROUND OF THE INVENTION

Irrigation systems for commercial and residential applications commonly employ a water control system to regulate watering cycles as to area, amount, and timing. Typical systems will include a time clock that is operative to control electrically operated control valves in accordance with a programmed schedule based on day and time. While substantially improving over purely manual control of the cycle, such systems did not correlate prevailing soil moisture condition to system operation, resulting in excess or insufficient distribution.

Moisture sensing systems have been developed for use in connection with these systems as disclosed in U.S. Pat. Nos. 4,952,868 to Scherer and U.S. Pat. No. 5,445,167 to Goff. Upon sensing requisite moisture conditions indicating a requirement for irrigation, a signal is transmitted for actuating an electrically controlled valve for supplying water to the conduit and distributor for supplying irrigation in the monitored zone. Connection between the sensor and control valve oftentimes spans a considerable distance. Accordingly, direct wiring is difficult and costly to undertake in existing installation wherein structures, roadways and other obstacles may be disposed therebetween. RF systems have been proposed to overcome the limitations of the wire connected systems. The RF systems, generally requiring line-of-sight access between the transmitted and received. The effectiveness can be compromised by existing obstacles as well as interference from high power RF transmissions.

In view of the foregoing, it would be desirable to provide an irrigation system that can utilize moisture detectors and transmit conditions thereat to remote locations, reliably and cost effectively.

BRIEF SUMMARY OF THE INVENTION

The present invention provides an acoustical coupling system utilizing existing conduit systems for transmitting conditions at a remote event location to a control location for conditioning affirmative action. In application to an irrigation system, a moisture detector transmits a signal to transmitter acoustically coupled to the conduit supplying water for the sensed irrigation zone. The signal is encoded for location and moisture condition. The transmitter generates a pressure wave based on the encoded signal in the conduit to a receiver at a location proximate the control valve for the conduit. The received signal is decoded and interpreted and if irrigation criteria are met transmits a signal allowing valve opening during the prescribed watering cycle for the zone. The acoustical coupling allows for effective transmission over extended distances and in the presence of other networked conduits, and notwithstanding existing or future obstacles deterring or frustrating the prior communications systems.

Accordingly, it is an object of the present invention is to provide a control system using fluid conduits for transmitting control information between sensed and controlled locations.

A further object of the invention is to provide a moisture controlled irrigation system for existing supply conduits.

Another object of the invention is to provide an acoustically coupled communications system utilizing in-place conduits for the transfer of information.

Yet another object is to provide a pool alert system using detection of pool pressure waves to signal alert conditions.

DESCRIPTION OF THE DRAWINGS

The above and other objects and advantages of the present invention will become apparent upon reading the following detailed description taken in conjunction with the accompanying drawings in which.

DETAILED DESCRIPTION OF THE PREFERRED EMBODIMENTS

Figure 1:
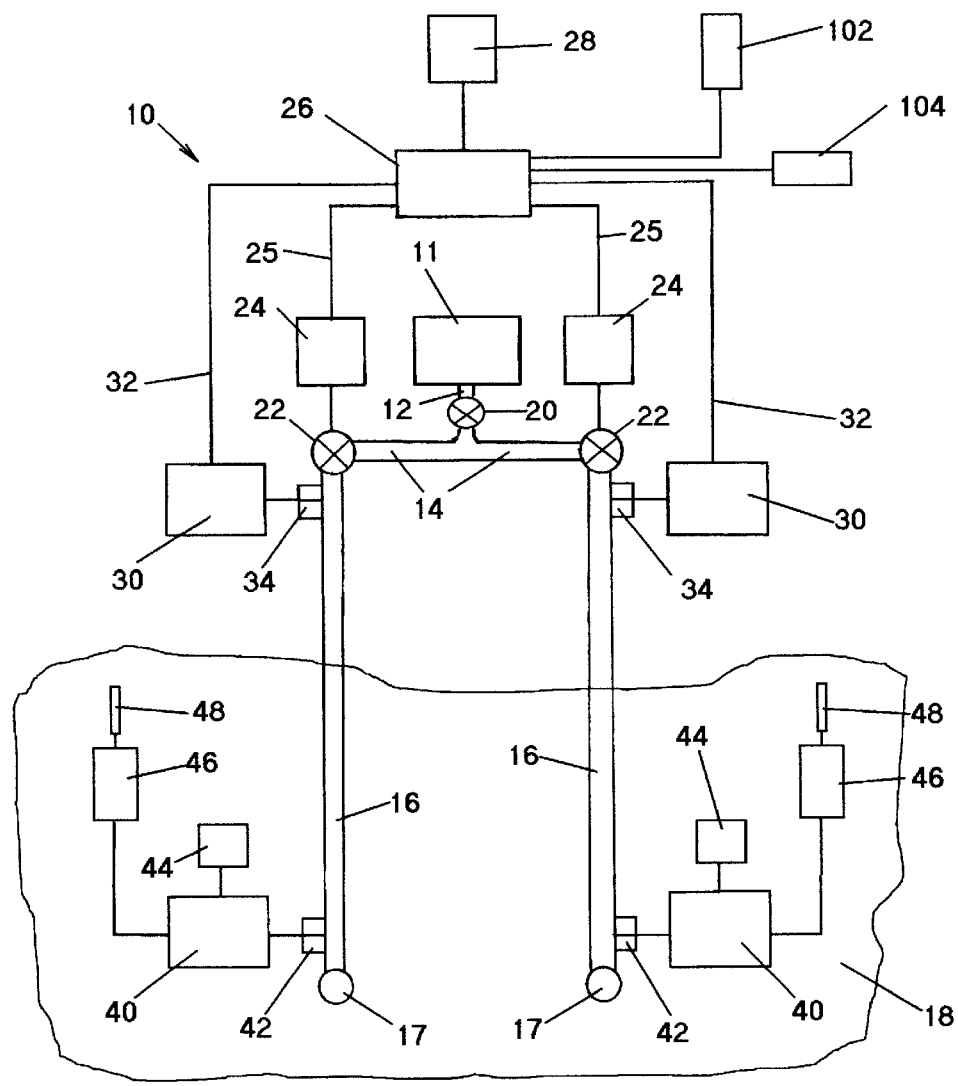
FIG. 1 is a schematic diagram of a fluid coupled irrigation control system in accordance with a preferred embodiment of the invention.

Referring to the drawings for the purpose of describing the preferred embodiment and not for limiting same, FIG. 1 illustrates a fluid coupled control system for irrigation 10 for controlledly routing irrigation water from a water supply 11 through main conduit 12 and branch conduits 14 to supply conduits 16 and discharging water through water distributors 17 to an irrigation field 18.

Flow from the water supply 11 to the main conduit 12 is controlled by valve 20. Flow from the branch conduits 14 to the supply conduits 16 is controlled by branch valves 22 coupled to valve actuators 24. The valve actuator 24 may be electrically, pneumatically or otherwise remotely operated and controlled. The actuators 24 are operatively connected along lines 24 to a master controller 26 connected to power supply 28. As described in greater detail below, the master controller 26 regulates the operation of the valves 22 to supply water through supply conduits 16 and irrigate the monitored portion of the irrigation field 18 serviced thereby, in accordance with a irrigation program of prescribed times and durations and subject to prevailing moisture conditions.

The master controller 26 is operatively connected with inlet control systems 30 along lines 32. Each inlet control system 30 is connected with an acoustical coupler 34 operatively connected with the supply conduits 16 downstream of the branch valve 22.

Outlet control systems 40 are connected with the supply conduits 16 at outlet acoustical couplers 42 upstream of the distributors 17, and with local power supply 44. A moisture sensor 46 and moisture probe 48 are connected with each outlet control system 40.

Based on moisture conditions determined by the moisture probe 48, the acoustical couplers 34, 42 communicate through the medium of the conduits 16, and fluid therein, to the master controller 26 for controlling the operation of the valves 22 during the course of the irrigation program.

The moisture probe 48 may be a conventional construction, preferably a pair of insulated wires that are exposed at outer ends and connected at the other ends to the sensor 46. The probe 48 is buried in the portion of the irrigation field 18 controlled by the local distributor 17 at a location and depth providing the best conditions for determining the moisture requirements thereat. In a well known manner the conductivity between the wires is a function of the prevailing moisture conditions and accordingly the current through the probes is related thereto. The sensor 46 receives the input from the probe 48 and, based on aggregate or comparative values, sends a signal to the outlet control system 40 when ground conditions warrant irrigation. A suitable moisture probe and sensor is disclosed in the above mentioned U.S. Pat. No. 5,445,176, which is hereby incorporated by reference.

Figure 2:
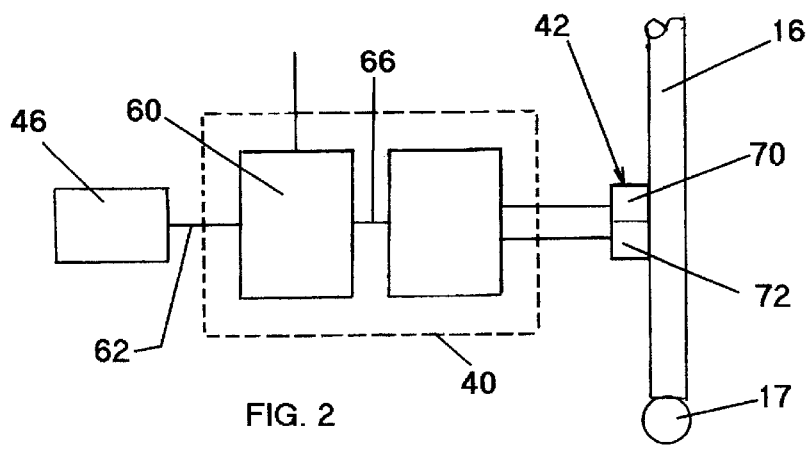
FIG. 2 is a block diagram of the outlet control system for moisture sensor and probe.

Referring to FIG. 2, the outlet control system 40 includes an amplifier 60 that receives the signal from the sensor 46 along line 62. The amplifier 60 is connected with an audio encoder/decoder 64 along line 66. The outlet acoustic coupler 42 includes a transmitter 70 and a receiver 72, respectively connected with the encoder/decoder 64 along lines 74, 76. The amplifier 60 amplifies and conditions the signal from the sensor 46 for presentation to the encoder/decoder 64. A suitable commercially available amplifier is a dual digitally controller amplifier array, product no. FX029 from CML Semiconductors Products.

The encoder/decoder 64 encodes the signal from the amplifier 60 into a coded format that ascribes an identity and condition to the deployed moisture sensor and probe and is outputted to the transmitter 70. The encoder/decoder also receives a signal from the receiver 72 for addressing the amplifier 60 to switch between active and muted states. A suitable encoder/decoder is commercially available as a family radio processor, model no. CMX838 from Consumer Microcircuits Limited. Acceptable formats include a binary basis such as Morse Code, a frequency tonal format, such as telephone tones, .or other open or proprietary codes.

The transmitter 70 and the receiver 72 may be separate or integrated devices. In one acceptable arrangement, the transmitter comprises a solenoid device physically mounted exterior of the conduit 16 and including an output member that mechanically impacts the conduit to provide an acoustical input to the conduit and contained fluid in accordance with a code input from the encoder/decoder 64, thereby propagating an interpretable pressure wave for receipt and discrimination by the inlet control system. In another acceptable arrangement, the transmitter may comprise an electronic transducer/receiver for receiving, as an integrated unit, or outputting an interpretable pressure wave in the selected code format. The transmitter may be exteriorally coupled to the conduit or interiorly mounted therein. In the later case, the device functions as a hydrophone acoustically coupled with the fluid. A suitable device meets test and performance criteria attendant to European Standard EN55103 (1996, part 1 and 2.

It will be appreciated that the foregoing will impart or receive an encoded pressure wave throughout the conduit, without substantial diminution over substantial distances for liquids, thereby allowing unique information on the irrigation requirements at the local site.

Figure 4:
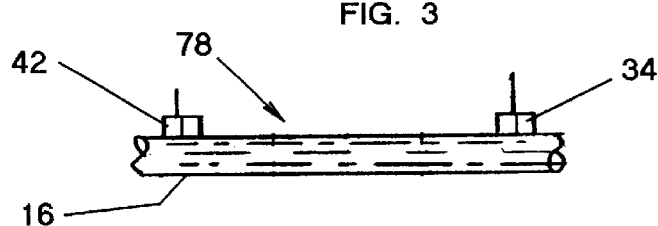
FIG. 4 is a flow diagram of the irrigation control system.

Referring to FIG. 4, the acoustical coupling system 78 propagates the acoustic pressure wave from the transmitter of the outlet acoustical coupler 42 to the receiver of the inlet acoustical coupler 34 for presentation, interpretation and control response through the inlet control system 30.

Figure 3:
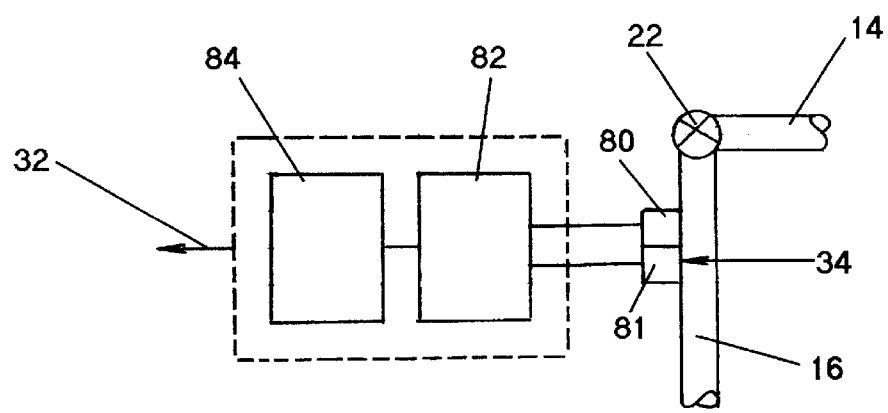
FIG. 3 is a block diagram of the inlet control system for the flow control valves.

For the purposes of the present embodiment, the inlet acoustical coupler 34 and the inlet control system may replicate or functionally embrace the components of the outlet counterparts. Referring to FIG. 3, the receiver 80 of the coupler 34 receives the encoded pressure wave from the outlet acoustical coupler 42 and inputs the generated signal to an inlet encoder/decoder 82 whereat the signal is analyzed and compared to the requisite encoding denoting the associated coupler 42. If matched, an output is outputted to an amplifier 84 thereby outputting a signal along line 32 to the master controller 26. Thereupon, the master controller 26 delivers a signal along line 25 to open the control valve 22 and deliver water from the supply 11 through conduit 16 for distribution through distributor 17 for irrigation of the associated portion of the irrigation field 18. Depending on programming at the master controller, the irrigation cycle may continue for a predetermined time or terminated when the moisture probe 48 reaches the threshold value.

Figure 5:
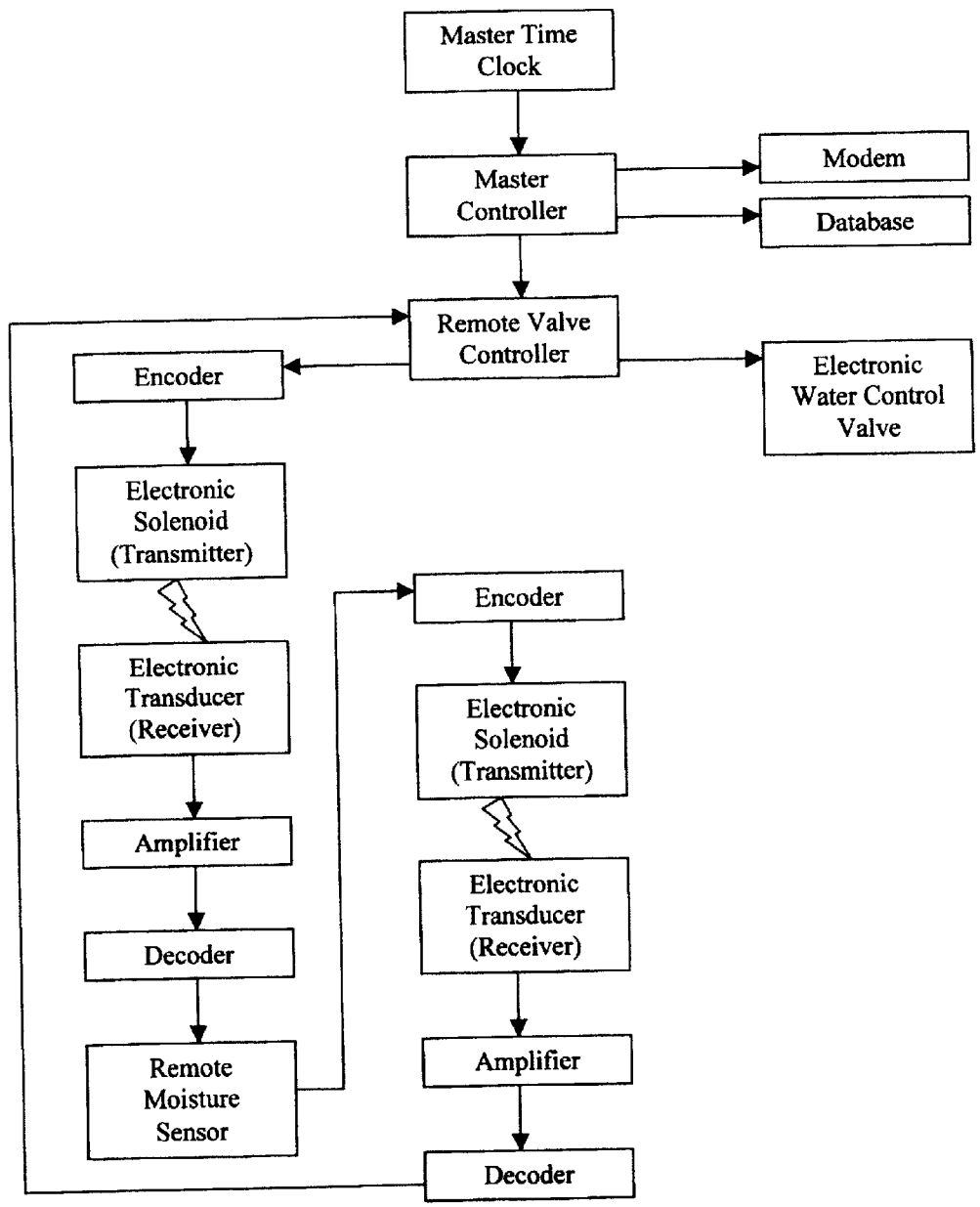
FIG. 5 is a schematic diagram of the acoustical coupling system.

The master controller 26 is a microprocessor based programming, communication and data management device, which is a preferred replacement for the master time clocks conventionally used for regulating irrigation control zones. A preferred controller is a communications controller commercially available as model CMX850 from CML Microsystems. Alternatively as shown in FIG. 5, the controller may be placed between a master time clock 100 and the control valves 22.

The master controller may provide a plurality of functions with respect to the irrigation field and the individual irrigation zones. The controller includes communication ports for local programming of data 102 or remote programming through modem 104. Desirable control parameters may include user name and password, date and time, operation reporting, utility access and control, alarm reporting and data collection.

For the irrigation schedule, the controller may be programmed for establishing irrigation cycles as a function of day and time as well as establishing black-out days as prescribed by regulatory authorities. Additionally, rather than using a comparative threshold moisture signal from the sensor 46, the master controller may directly acquire the signal from the sensor, set threshold values and threshold offsets for initiating the watering program for each valve and irrigation zone. Moreover, for extreme conditions, such as low moisture levels, the controller may override the parameter set for the programmed irrigation schedule.

In another embodiment, the control system of the present invention may be retrofitted into existing irrigation systems conventionally operated by master time clocks and electrically controlled valving. Therein, the master time clock is connected to the inlet valve controller. The conduits are provided with the acoustic couplers, control systems and moisture sensing systems as described above. The signal from the inlet control system is connected with a switch interposed between the clock and controller. When the master time clock is scheduled for irrigation of the zone supplied by the associated conduit, power is supplied to the line. If the moisture probe and sensor determine a water requirement, the requisite signal is transmitted through the control systems and acoustic coupler, resulting in a signal closing the switch and enabling closure of the valve for conducting the irrigation. When threshold or threshold offset conditions are attained, the switch opens interrupting the cycle. If irrigation is not required, the circuit remains open and the valve closed. It will be appreciated that supplemental circuitry may be provided maintaining the watering cycle based on the initial determination.

In typical operation as shown in FIG. 5, the master controller is interfaced with the master time clock and the remote valve controller section and sends an encoded query signal to the remote receiver through the acoustical coupling. The encoded signal is amplified, decoded, and the moisture sensor signal is sampled, encoded, transmitted through the acoustical coupling to the controller section for appropriate actuation of the control valve.

Figure 6:
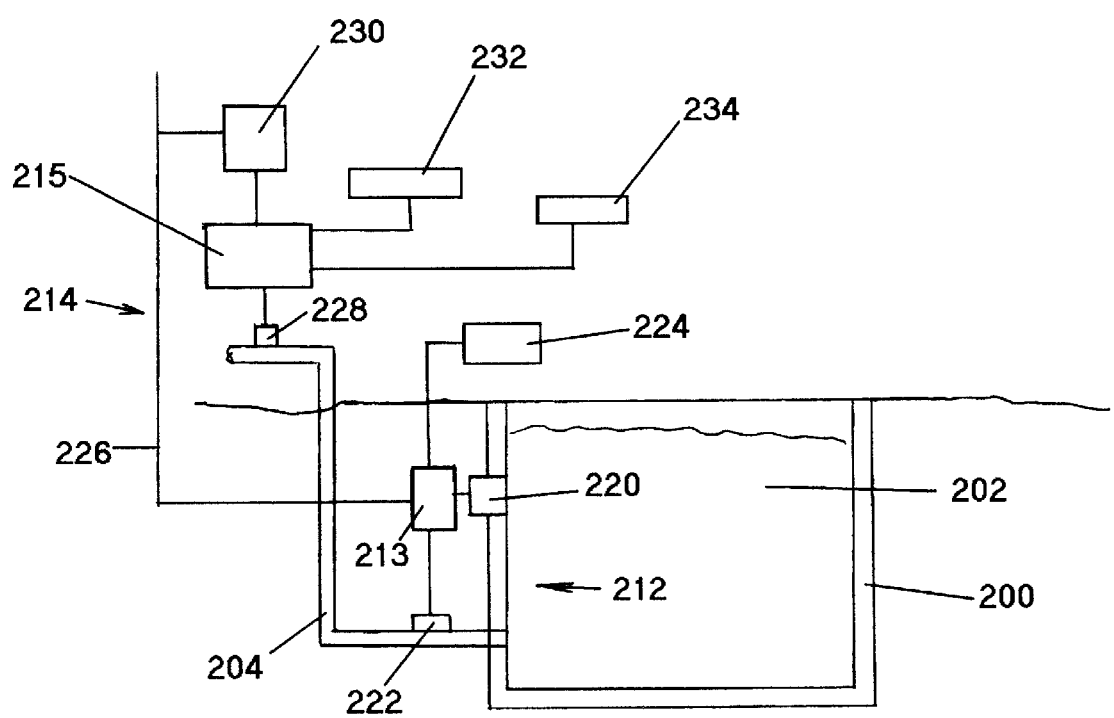
FIG. 6 is a schematic diagram of fluid coupled control system for a swimming pool in accordance with another embodiment of the invention.
Figure 7:
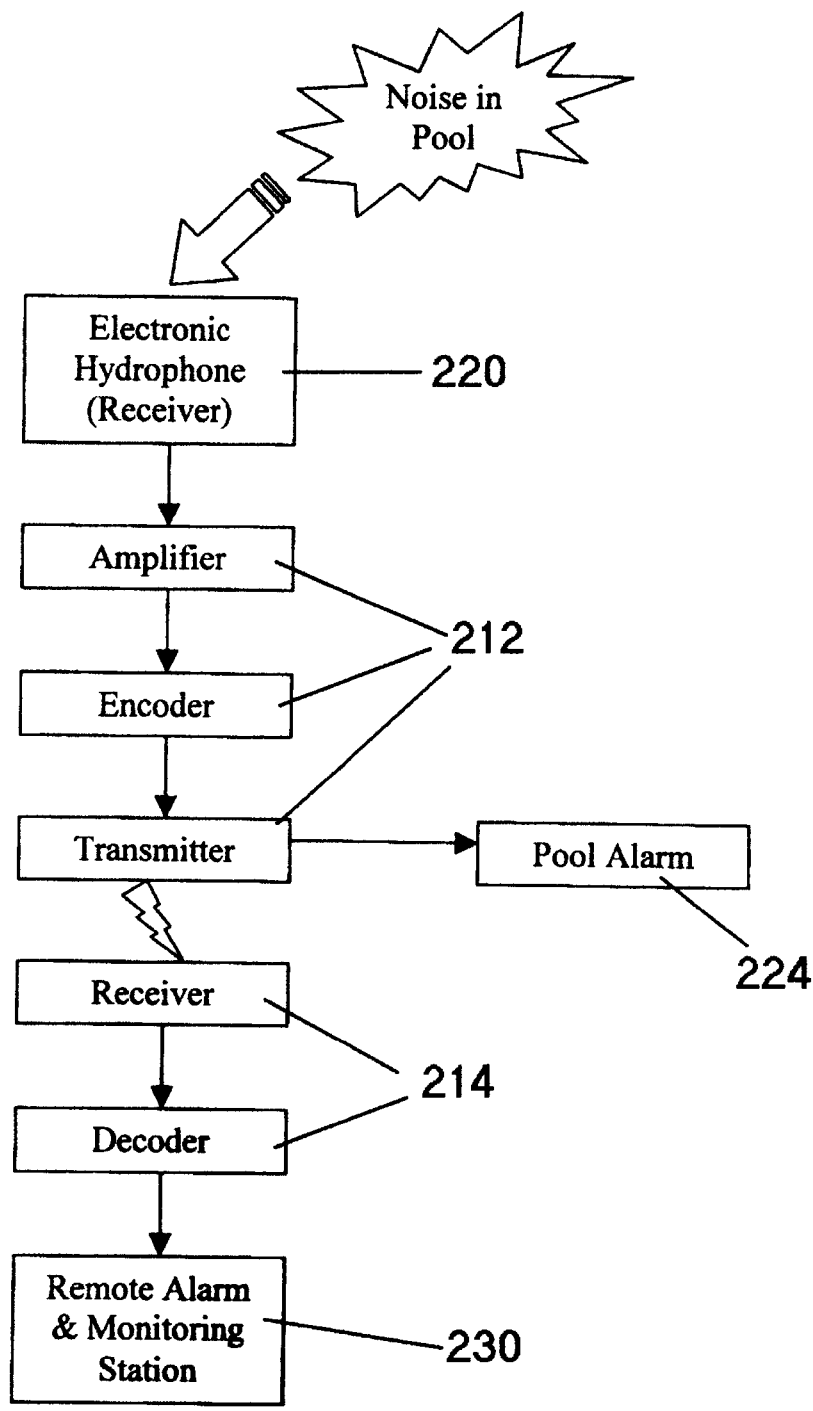
FIG. 7 is a flow diagram of the swimming pool control system incorporating a fluid coupled acoustic control system in accordance with another embodiment of the invention.

In a further embodiment as shown in FIGS. 6 and 7, the foregoing coupling system is used in connection with an alarm system for a swimming pool wherein it is desired for monitoring, protective or alert purposes to determine types of activity in the pool. Therein, a pool enclosure 200 containing a water volume 202 includes a water supply conduit 204 connected with a water supply. The acoustical coupling system includes a first acoustical coupling unit 212 and a first control system 213, and a second acoustical coupling unit 214 and a second control system 215 deployed in acoustical contact with the water volumes at spaced locations. Preferably, the first coupling unit is a hydrophone unit having a receiver and transmitter disposed adjacent the outlet of the supply conduit 204. Alternatively, in view of the detection and transmission capabilities of the acoustical coupling system, the coupling unit may be positioned at other locations on the enclosure 200.

The control system 213 includes an amplifier receiving the signal from the receiver 220 and outputting to an encoder/decoder 222, both of the types described above. If a desired triggering event is detected, a signal is outputted to the transmitter 22 of the coupling unit 212. Concurrently, the signal may activate an alarm 224. In a preferred embodiment, the receiver 220 and the control system 213 are housed at a pool light cavity for convenience and access to a power supply 226.

The second acoustical coupling unit 214 including a receiver 228 of the above described types is connected at a convenient location along the conduit 204. The coupling unit 214 is connected with a control system 215 including an amplifier and comparator. Upon detecting a signal in excess of a predetermined threshold, indicative for example of a small object such as a child being in the pool while the system is enabled, an output is directed to a monitoring device including for example one or more of a video monitor 230, an audible alarm 232, a visual indicator 234.

In operation and with reference to FIG. 7, a noise in pool is transmitted and detected by the receiver 220 of the coupling unit 212, outputted to the amplifier 254 encoder of the control system 213. An output from the encoder is fed to the transmitter 22 and acoustically transmitted to the receiver 228 of the second coupling unit 214. Concurrently, the signal triggers a pool alarm 262. The receiver 228 is outputted to a decoder, with a requisite event outputted to remote alarm and monitoring station 266.

It will be appreciated that the acoustical coupling system of the present invention may be used in other applications wherein an event at a first location is detected or mandated and it is desired to transmit information based thereon to a remote location utilizing in place conduit assets. The triggering signal is developed, encoded to ascribe location and condition, acoustically transmitted to a remote location along the conduit network to a remote location whereat the signal is decoded, identified and used to condition a prescribed activity. Further, it will be appreciated that the acoustical system may be utilized in fluid systems containing solids content, such as sewers or the like, as well a gas based systems. For example, gas and petroleum operations may preclude electrical communication wiring because of potential risks. In the present invention, the use of the in-place lines can be effectively used as the medium to transmit and receive data.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. A control system for irrigation, comprising: a conduit having an inlet fluidly connected with a first valve connected to a water supply and an outlet disposed at a remote location for carrying water therewithin and applying said water to an irrigation zone; a remote power supply; moisture detection means connected to said remote power supply and located in said irrigation zone, said moisture detection means providing a moisture signal in accordance with moisture condition thereat; first control means connected to said remote power supply for receiving said moisture signal and outputting a first encoded signal based on said moisture condition; first acoustic coupling means including outlet transmitter means acoustically coupled with said conduit proximate said outlet for receiving said first encoded signal and generating an acoustic pressure wave to said water based on said first encoded signal; second acoustical coupling means including inlet receiver means acoustically coupled with said conduit proximate said inlet for receiving said pressure wave and generating a control signal based thereon; and second control means connected to a local power supply for receiving and decoding said control signal and conditioning said valve for opening if prescribing a need for water in said irrigation zone.

2. The control system as recited in claim 1 wherein said outlet transmitter means of said first acoustical coupling means includes solenoid means mechanically coupled exterior of said water supply proximate said outlet for mechanically generating said acoustic pressure wave.

3. The control system as recited in claim 1 wherein said outlet transmitter means of said first acoustical coupling means includes a transducer located within said conduit.

4. The control system as recited in claim 1 wherein said inlet receiver means of said second acoustical coupling means includes a transducer located in said conduit for receiving said acoustic pressure wave.

5. The control system as recited in claim 1 wherein said second acoustical coupling means includes an inlet transmitter means for generating a pressure wave based on an irrigation cycle for said conduit.

6. The control system as recited in claim 5 wherein said first acoustical coupling means includes an outlet receiver means for receiving said pressure wave based on said irrigation cycle and outputting an encoded signal to said first control means, and wherein said first control means includes decoding means for processing said encoded signal and obtaining the condition of the moisture detection system.

7. A control system for irrigation, comprising: a conduit having an inlet fluidly connected with a first valve connected to a water supply and an outlet disposed at a remote location for carrying water therewithin and applying said water to an irrigation zone; a remote power supply; moisture detection means connected to said remote power supply and located in said irrigation zone, said moisture detection means providing a moisture signal in accordance with moisture condition thereat; first control means connected to said remote power supply for receiving said moisture signal and outputting a first encoded signal based on said moisture condition; first acoustic coupling means including outlet transmitter means acoustically coupled with said conduit proximate said outlet for receiving said first encoded signal and generating an acoustic pressure wave to said water based on said first encoded signal; second acoustical coupling means including a hydropbone as inlet receiver means acoustically coupled with said conduit proximate said inlet for receiving said pressure wave and generating a control signal based thereon; and second control means connected to a local power supply for receiving and decoding said control signal and conditioning said valve for opening if prescribing a need for water in said irrigation zone.

* * * * *